United States Patent
De Maina

(10) Patent No.: US 6,739,671 B2
(45) Date of Patent: May 25, 2004

(54) VEHICLE SEAT

(75) Inventor: Cosimo De Maina, Alpignano (IT)

(73) Assignee: Petra Italia S.a.s. di Marina Bordo & C., Turin (IT)

( * ) Notice: Subject to any disclaimer, the term of this patent is extended or adjusted under 35 U.S.C. 154(b) by 0 days.

(21) Appl. No.: 10/354,770

(22) Filed: Jan. 30, 2003

(65) Prior Publication Data

US 2003/0173815 A1 Sep. 18, 2003

(30) Foreign Application Priority Data

Feb. 1, 2002  (IT) ..................... TO2002A0097

(51) Int. Cl.$^7$ .................................. A47C 7/00
(52) U.S. Cl. ................. 297/440.1; 297/440.11; 297/440.2; 297/440.21; 297/440.22
(58) Field of Search ............ 297/440.1, 440.11, 297/440.2, 440.21, 440.22

(56) References Cited

U.S. PATENT DOCUMENTS

| | | | |
|---|---|---|---|
| 2,572,482 A | | 10/1951 | Hoven et al. |
| 2,583,262 A | * | 1/1952 | Robins ................ 425/188 |
| 2,694,438 A | * | 11/1954 | Frech ................... 297/1 |
| 2,931,427 A | | 4/1960 | Goldstein |
| 3,600,035 A | * | 8/1971 | Vondrejs .............. 297/10 |
| 3,640,576 A | * | 2/1972 | Morrison et al. ...... 297/440.11 |
| 4,848,843 A | * | 7/1989 | Gibbs ................. 297/440.22 |
| 5,382,080 A | * | 1/1995 | Gamberini et al. .... 297/440.1 |
| 5,464,273 A | * | 11/1995 | Makoto .............. 297/232 |
| 5,655,816 A | * | 8/1997 | Magnuson et al. ..... 297/452.2 |
| 5,716,101 A | * | 2/1998 | Frinier et al. ........ 297/440.22 |
| 6,030,040 A | * | 2/2000 | Schmid et al. ........ 297/284.2 |
| 6,254,190 B1 | * | 7/2001 | Gregory .............. 297/452.1 |
| 6,511,562 B1 | * | 1/2003 | Coffield .............. 156/66 |
| 6,527,285 B1 | * | 3/2003 | Calandro ............. 280/87.051 |

FOREIGN PATENT DOCUMENTS

| | | | | |
|---|---|---|---|---|
| DE | 197 05 603 A1 | 8/1998 | ............ | B60N/2/44 |
| FR | 1238929 | 7/1960 | | |
| FR | 2317893 | 2/1977 | | |

* cited by examiner

*Primary Examiner*—Peter M. Cuomo
*Assistant Examiner*—Sarah C. Burnham
(74) *Attorney, Agent, or Firm*—Chapman and Cutler LLP

(57) ABSTRACT

A vehicle seat having a supporting structure, and a first and second contoured panel fitted to the supporting structure and defining the seat portion and the backrest of the seat respectively. The supporting structure has a first and a second lateral supporting member extending along opposite sides of the seat and connected to each other by a transverse member extending along the join between the seat portion and the backrest.

14 Claims, 6 Drawing Sheets

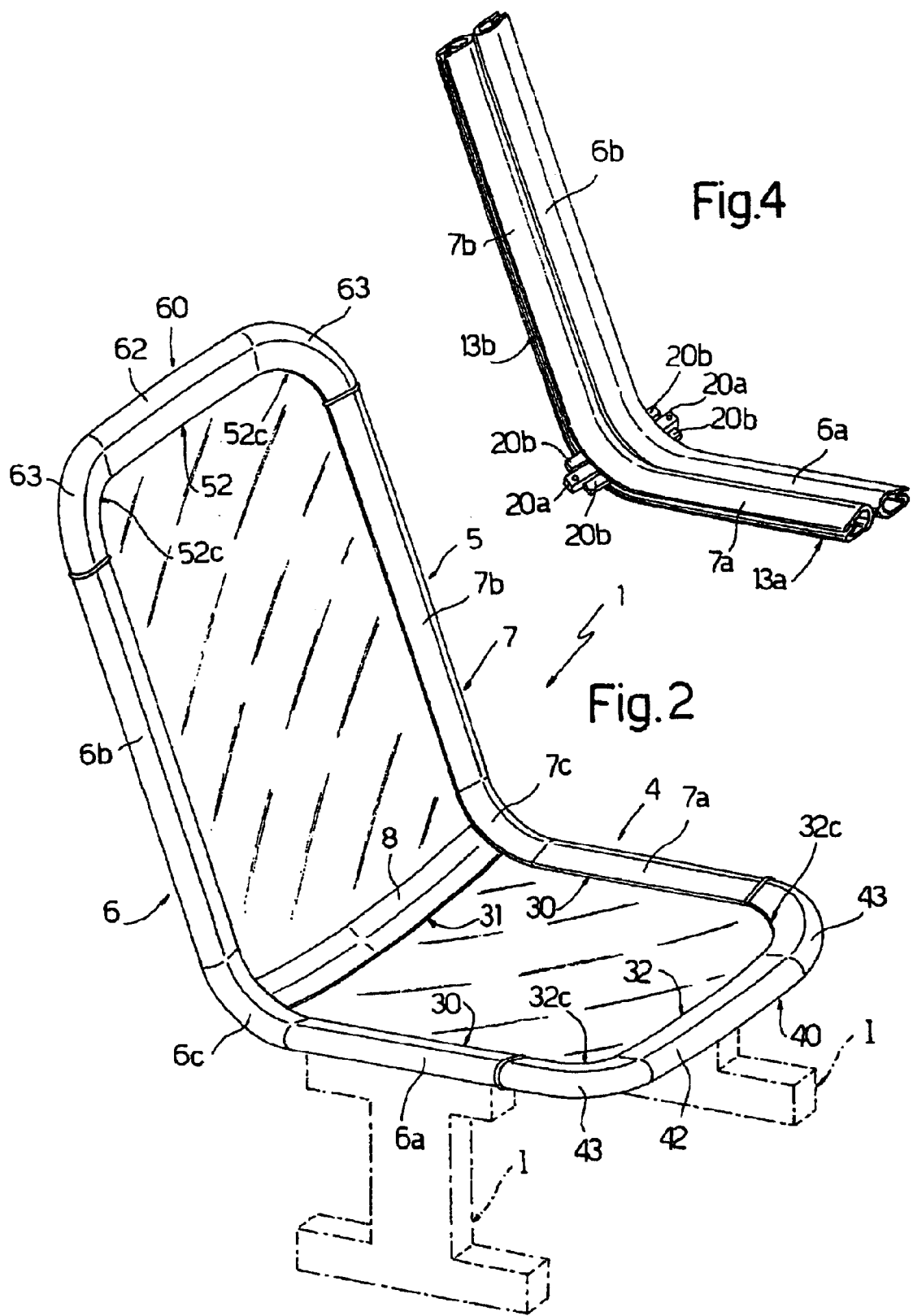

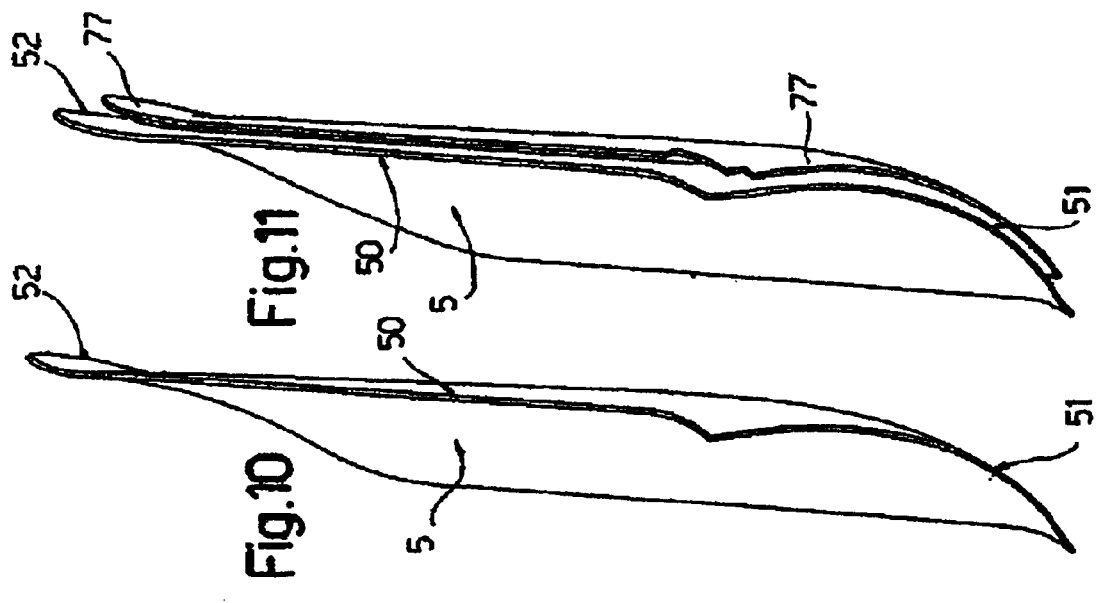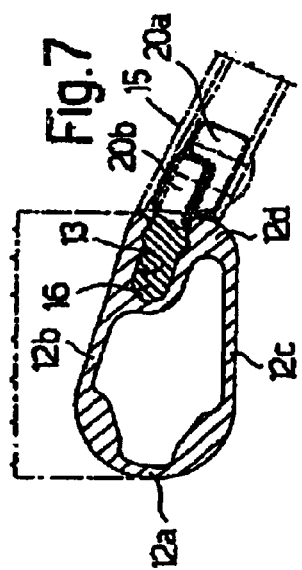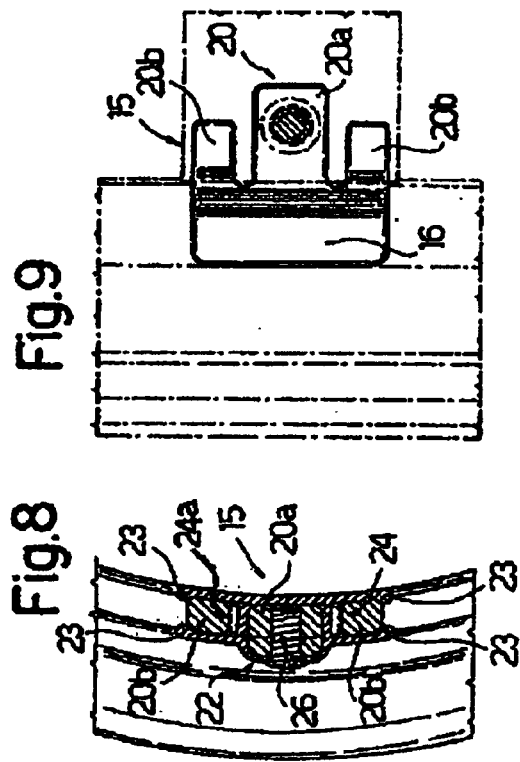

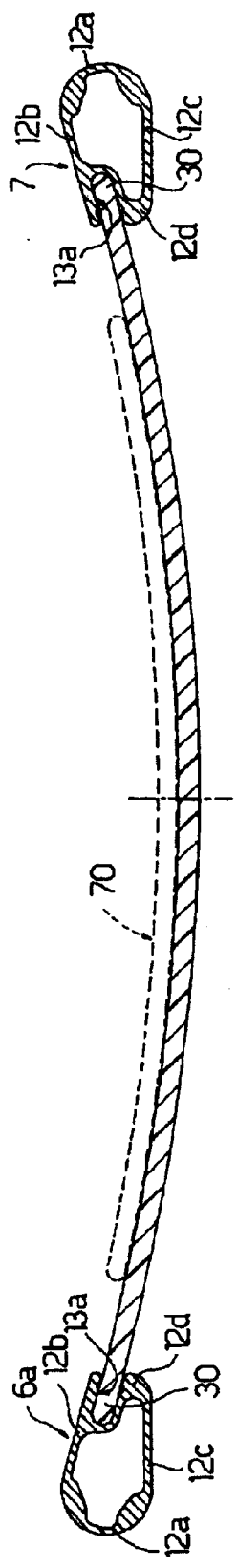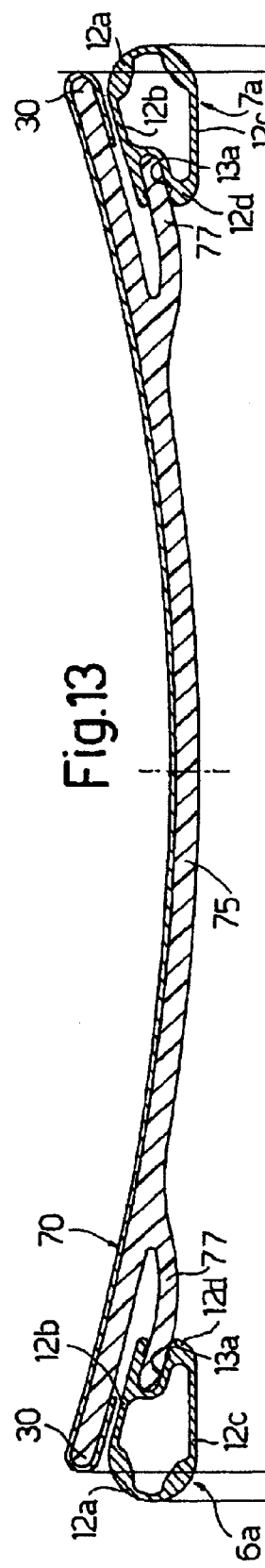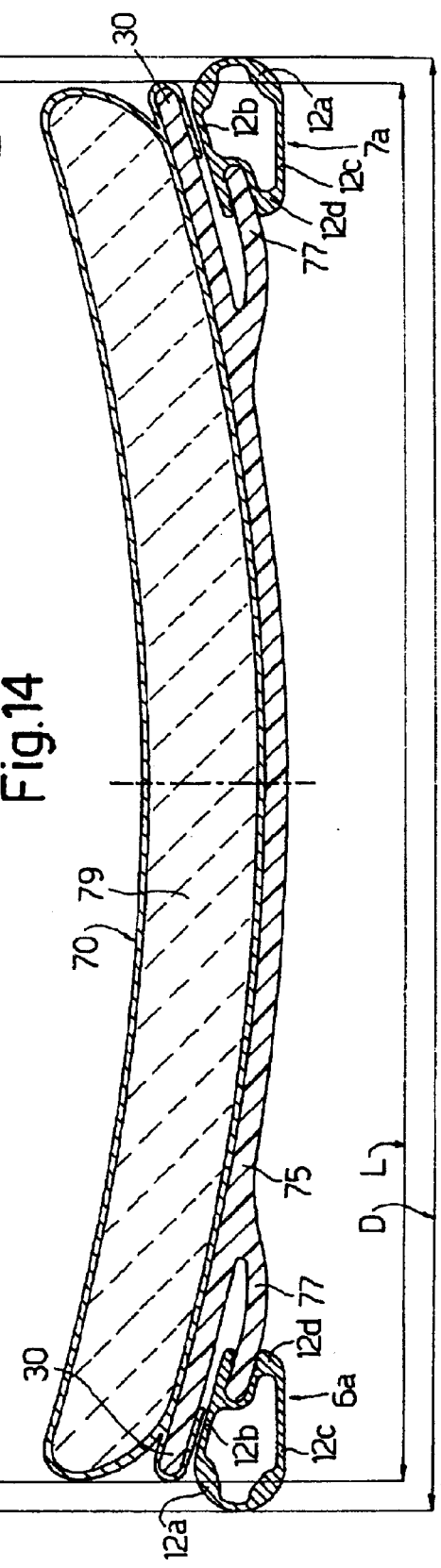

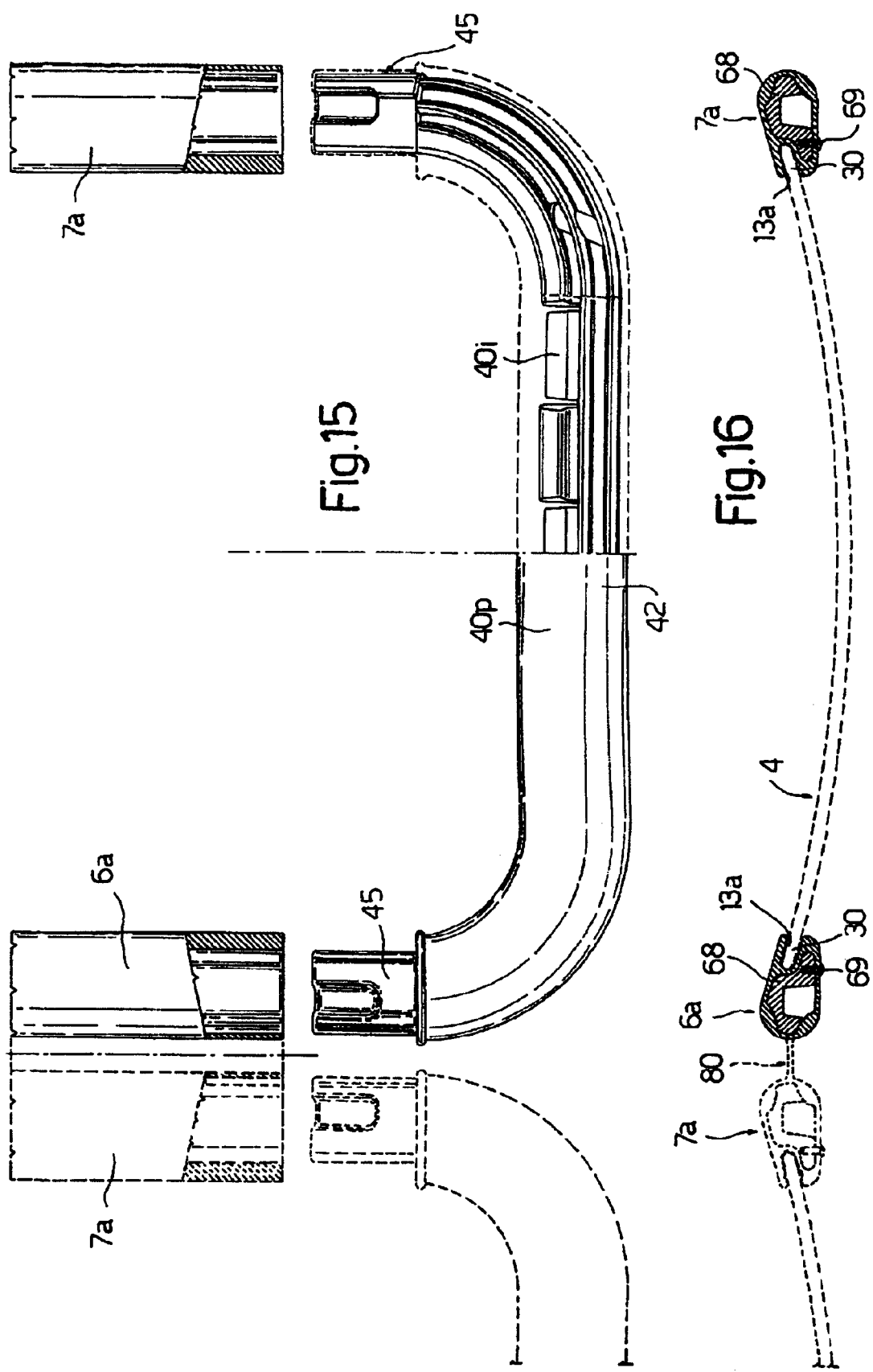

US 6,739,671 B2

VEHICLE SEAT

SUMMARY OF THE INVENTION

More specifically, it is an object of the present invention to provide a vehicle seat comprising a small number of parts, and which can be produced quickly and cheaply, even using unskilled labour.

According to the present invention, there is provided a vehicle seat comprising a supporting structure, and a first and second contoured panel fitted to the supporting structure and defining the seat portion and the backrest of the seat respectively; characterized in that the supporting structure comprises a first and a second lateral supporting member extending along opposite sides of the seat and connected to each other by a transverse member extending along the join between the seat portion and the backrest.

BRIEF DESCRIPTION OF THE DRAWINGS

A preferred, non-limiting embodiment of the invention will be described by way of example with reference to the accompanying drawings, in which:

FIG. 2 shows a view in perspective of a vehicle seat in accordance with the teachings of the present invention;

FIG. 4 shows a view in perspective of a structural member of the FIG. 3 variation;

FIGS. 7, 8 and 9 show three different views of a connecting portion for connecting two structural members of the seat according to the present invention;

FIG. 10 shows a view in perspective of a contoured panel forming the backrest of the seat according to the present invention;

FIG. 11 shows a variation of the FIG. 10 backrest;

FIG. 12 shows a cross section of the seat portion of the seat according to the present invention;

FIG. 13 shows a first variation of the FIG. 12 seat portion;

FIG. 14 shows a second variation of the FIG. 12 seat portion;

FIG. 15 shows a partly sectioned topside view of one end of the seat portion of the FIG. 3 seat;

FIG. 16 shows a cross section of the FIG. 15 seat portion.

DETAILED DESCRIPTION OF THE INVENTION

Figure 1:
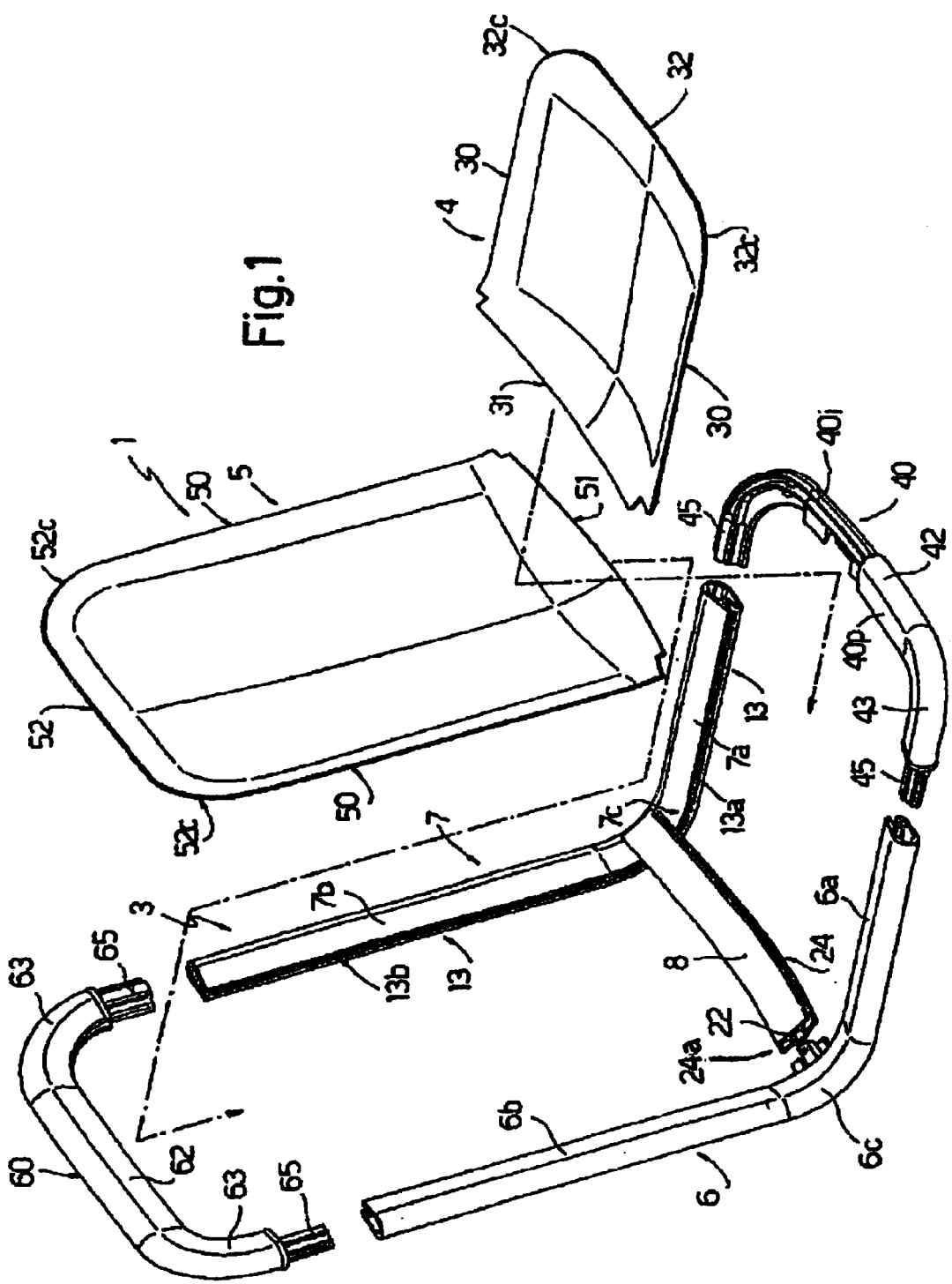
FIG. 1 shows an exploded view in perspective of a vehicle seat in accordance with the teachings of the present invention.
Figure 5:
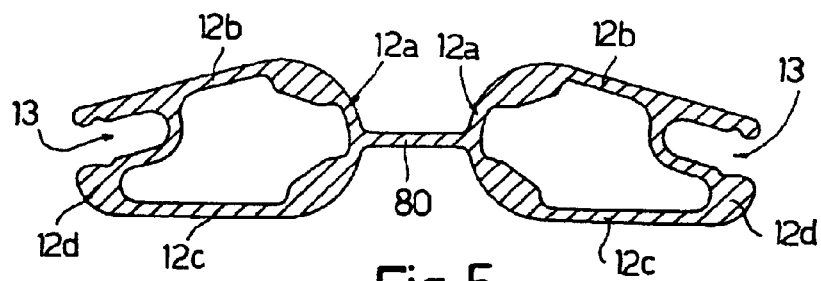
FIG. 5 shows a cross section of the FIG. 4 structural member.

Number 1 in FIG. 1 indicates as a whole a vehicle seat.

Vehicle seat 1 comprises a supporting structure 3; and two contoured panels 4, 5 fitted to supporting structure 3 and defining the seat portion and backrest of seat 1 respectively.

Supporting structure 3 comprises a first and a second lateral supporting member 6, 7 extending along opposite sides of seat 1 and connected to each other by a transverse member 8 extending along the join between the seat portion and the backrest (see also FIG. 2).

More specifically, each lateral supporting member 6, 7 comprises a first straight portion 6a, 7a; and a second straight portion 6b, 7b longer than first portion 6a, 7a and connected to first portion 6a, 7a by an integral C-shaped connecting portion 6c, 7c.

Each lateral supporting member 6, 7 is preferably defined by a tubular metal section (e.g. of aluminium).

More specifically (FIG. 6), the metal section comprises a C-shaped first side wall 12a integral with two substantially flat walls 12b, 12c facing and sloping with respect to each other so as to merge with a substantially C-shaped second side wall 12d.

Figure 6:
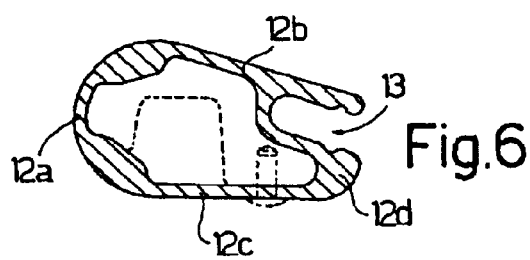
FIG. 6 shows a cross section of a structural member of the seat according to the present invention.

At wall 12d, the section comprises a substantially U-section groove 13 which extends along the whole length of lateral member 6, 7 (FIGS. 1 and 6).

Each first straight portion 6a, 7a thus has a groove 13a facing the corresponding groove in the other first portion, and each second straight portion 6b, 7b has a groove 13b facing the corresponding groove in the other second portion.

At C-shaped portion 6c, 7c, groove 13 houses a connecting member 15 (FIGS. 7, 8 and 9) comprising a base portion 16 firmly housed inside groove 13; and three straight connecting appendixes 20 (FIGS. 9 and 1) extending integrally from base portion 16 and perpendicular to groove 13. More specifically (FIG. 9), appendixes 20 comprise a large rectangular central appendix 20a; and two rectangular lateral appendixes 20b shorter than and on either side of appendix 20a.

Transverse member 8 is preferably defined by a metal section (e.g. of aluminium) comprising a tubular square-section central portion 22 (FIGS. 8 and 1); and two pairs of walls 23 extending integrally from opposite faces of central portion 22 to form respective grooves 24, 24a, so that two grooves 24, 24a, extend along opposite sides of transverse member 8.

In a fitted position, opposite end portions of tubular square-section central portion 22 house respective central appendixes 20a, which are fixed firmly to transverse member 8 by means of screws 26 (FIG. 8); and appendixes 20b are inserted between walls 23 to engage end portions of grooves 24, 24a.

In its simplest form shown in FIGS. 1 and 12, contoured panel 4 is roughly rectangular, of constant thickness, and bounded (FIG. 1) by two straight lateral edges 30, by a substantially straight rear edge 31, and by a front edge 32 connected to lateral edges 30 by two curved portions 32c. Straight lateral edges 30 are housed (FIG. 12) inside respective grooves 13a of first straight portions 6a, 7a; rear edge 31 is housed inside a groove 24; and front edge 32 rests on a C-shaped connecting member 40 (FIGS. 1 and 2) forming part of supporting structure 3 and extending between end portions of first straight portions 6a, 7a. More specifically, C-shaped connecting member 40 comprises a substantially straight central portion 42 connected integrally at the ends to C-shaped curved portions 43, from which extend parallel straight appendixes 45 smaller in cross section than curved portions 43. Straight appendixes 45 are inserted inside respective openings defined by end portions of tubular first straight portions 6a, 7a. For which purpose, each appendix 45 has a cross section complementary to that of tubular supporting member 6, 7. Front edge 32 rests on straight portion 42, and curved portions 32c rest on C-shaped curved portions 43. Contoured panel 4 (FIG. 2) is fitted laterally to first portions 6a, 7a, is fitted at the rear to transverse member 8, rests at the front on connecting member 40, and is so connected firmly to supporting structure 3. Connecting member 40 comprises a core 40i made of metal (in particular, an aluminium casting—FIG. 1) covered with a layer of plastic material 40p.

In its simplest form shown in FIGS. 1 and 10, contoured panel 5 is roughly rectangular, of constant thickness, and bounded (FIG. 1) by two straight lateral edges 50, by a substantially straight bottom edge 51, and by a top edge 52 connected to lateral edges 50 by two curved portions 52c. Straight lateral edges 50 are housed inside respective grooves 134 of second straight portions 6b, 7b; bottom edge 51 is housed inside a groove 24a; and top edge 52 rests on a C-shaped connecting member 60 forming part of supporting structure 3 and extending between end portions of second straight portions 6b, 7b. More specifically, C-shaped connecting member 60 comprises a substantially straight central portion 62 connected integrally at the ends to C-shaped curved portions 63, from which extend parallel straight appendixes 65 smaller in cross section than the curved portions. Straight appendixes 65 are inserted inside respective openings defined by end portions of tubular second straight portions 6b, 7b. For which purpose, each appendix 65 has a cross section complementary to that of tubular supporting member 6, 7. Top edge 52 rests on central portion 62, and curved portions 52c rest on curved portions 63. Contoured panel 5 (FIG. 2) is fitted laterally to second portions 6b, 7b, is fitted at the bottom to transverse member 8, rests at the top on connecting member 60, and is so connected firmly to supporting structure 3. Like connecting member 40, connecting member 60 comprises a core made of metal (in particular, an aluminium casting—not shown) covered with a layer of plastic material.

The advantages of the present invention will be clear from the foregoing description: the seat described comprises a very small number of parts, has a strong structure, and is quick to make and efficient.

Seat 1, in fact, comprises only seven main parts: lateral supporting members 6, 7, transverse member 8, connecting members 40 and 60, and panels 4 and 5.

More specifically, lateral supporting members 6, 7 are first connected using transverse member 8; lateral edges 30 of panel 4 are inserted inside and slid along grooves 13a to engage rear edge 31 inside groove 24; and appendixes 45 are inserted inside sections 6a, 7a to assemble connecting member 40, which is then fixed firmly in place (e.g. by means of screws of rivets not shown) to retain panel 4 and connect lateral supporting members 6, 7 even more firmly.

Lateral edges 50 of panel 5 are inserted inside and slid along grooves 13b to engage bottom edge 51 inside groove 24a; and appendixes 65 are inserted inside sections 6b, 7b to assemble connecting member 60, which is then fixed firmly in place (e.g. by means of screws of rivets not shown) to retain panel 5 and connect lateral supporting members 6, 7 even more firmly.

The above operations are extremely simple, and can be performed quickly even using unskilled labour.

Either one of panels 4, 5 can be replaced—e.g. in the event of damage by vandals—by simply removing relative connecting member 40, 60, sliding the panel out along grooves 13, inserting a new panel, and fixing connecting member 40, 60 back onto lateral supporting members 6, 7.

The seat according to the present invention can be used to advantage on a wide range of vehicles, e.g. rubber-tired transport vehicles, such as city or intercity buses, etc., and "rail" vehicles, such as trains, trams, subway trains, etc.

Figure 3:
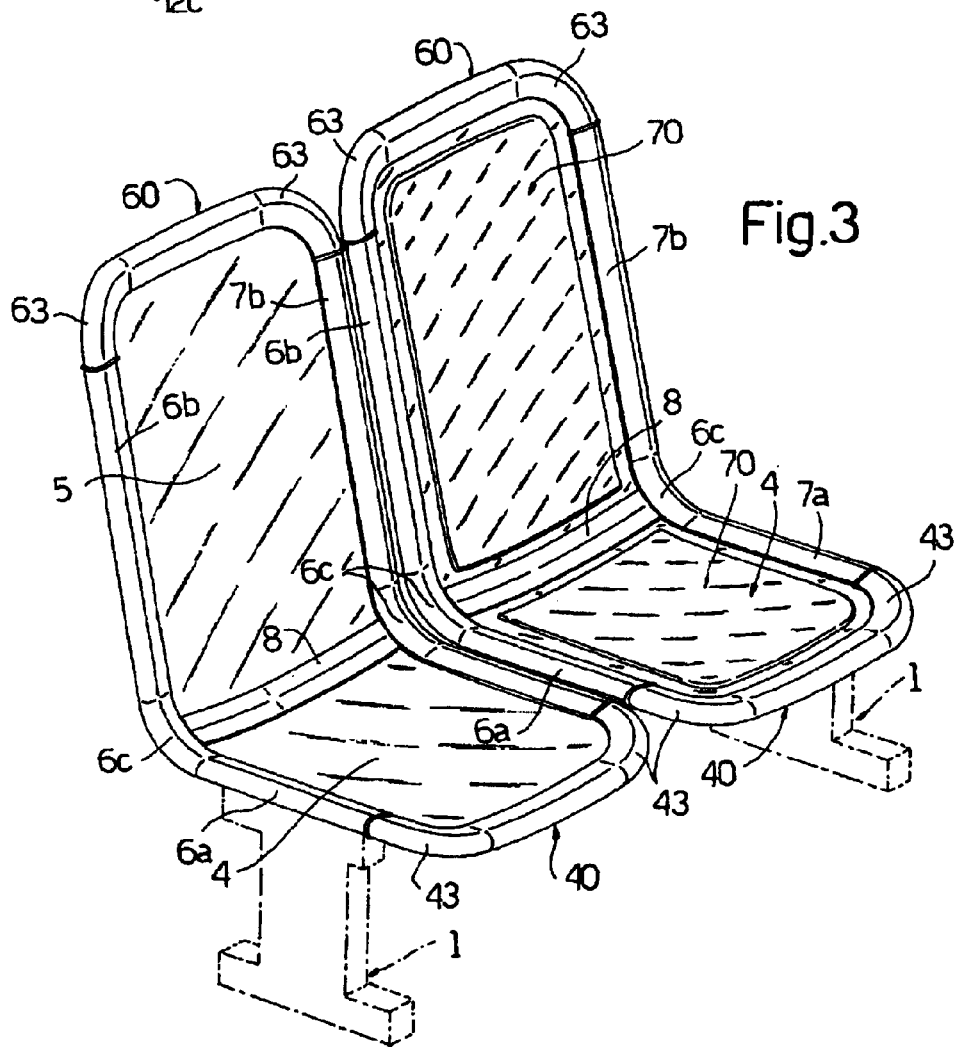
FIG. 3 shows a view in perspective of a variation of the vehicle seat in FIGS. 1 and 2.

For each application, seat 1 is fitted firmly to the vehicle, in particular to a supporting surface on the vehicle, using appropriate known connecting members I (shown by the dash lines in FIGS. 2 and 3).

Connecting members I are normally fitted to the underside of first straight portions 6a, 7a. For which purpose, the sections defining first straight portions 6a, 7a may be provided inside with reinforcing members 68 (FIG. 16) for receiving the threaded portions of screws 69 for connecting first straight portions 6a, 7a to connecting members I.

The seat described above is made in a particularly strong, practical basic version, in which panels 4, 5 are each defined by a contoured panel of highly resistant plastic material, in particular easy-wash, scratchproof and/or abrasionproof plastic material.

In a first variation (dash line in FIG. 12), panels 4, 5 may each be provided with a surface cover layer 70, e.g. of cloth.

In a second variation (FIG. 13, which shows a panel defining a seat portion, but which also applies to the seatback), panel 4, 5 may comprise a main portion 75 of a width L substantially equal to the distance D (FIGS. 13 and 14) between opposite lateral portions of lateral members 6 and 7, and having an integral lip 77 extending along lateral edges 30, 50 and along rear/bottom edge 31, 51 of panel 4, 5 (FIG. 11).

Lip 77 is spaced apart from one face of panel 4, 5, extends substantially parallel to main portion 75, and is a strictly constant distance from edges 30, 50 of panel 4, 5.

Lip 77 engages grooves 13 of straight portions 6a, 7a/6b, 7b, and grooves 24, 24a of transverse member 8; in which position, the peripheral portions of panel 4, 5 are located over and conceal walls 12b of straight portions 6a, 7a/6b, 7b.

In this case, too, main portion 75 may be covered with a layer of cloth 70.

Alternatively (FIG. 14), main portion 75 may be covered with a flat layer of soft material 79 in turn covered with cloth 70 to form a padded seat portion/backrest.

The variation shown in FIGS. 3, 4, 5, 15 and 16 comprises two seats connected integrally to each other.

More specifically, the adjacent lateral supporting members 6, 7 of different seats are defined by a single metal section, in which walls 12a (FIG. 5) are positioned facing and are connected, along the whole length of the supporting members, by an integral connecting wall 80.

Clearly, changes may be made to the vehicle seat as described and illustrated herein without, however, departing from the scope of the present invention.

What is claimed is:

1. A vehicle seat comprising a supporting structure (3), and a first and second contoured panel (4, 5) fitted to the supporting structure (3) and defining a seat portion and a backrest of the seat (1) respectively; wherein the supporting structure (3) comprises a first and a second lateral supporting member (6, 7) extending along opposite sides of the seat (1) and connected to each other by a transverse member (8) extending along a join between the seat portion and the backrest;

each lateral supporting member (6, 7) comprises a first straight portion (6a, 7a), and a second straight portion (6b, 7b);

each first straight portion (6a, 7a) has a respective first groove (13a) extending substantially along its whole length; and each second straight portion (6b, 7b) has a respective second groove (13b) extending substantially along its whole length;

two first grooves (13a) are positioned facing each other to house respective opposite lateral edges (30) of said first panel (4) to form said seat portion;

two second grooves (13b) are positioned facing each other to house respective opposite lateral edges (50) of said second panel (5) to form said backrest; and at least one of said panels (4, 5) comprises a main portion (75) of a width equal to a distance (D) between opposite lateral portions of said lateral supporting members (6, 7), and having an integral lip (77) extending at least along the lateral edges (30, 50) of said panel (4, 5);

said lip (77) engaging said first and/or said second grooves (13a, 14a).

2. A seat as claimed in claim 1, wherein said second straight portion (6b, 7b) is longer than the first straight portion (6a, 7a) and is connected to said first straight portion (6a, 7a) by an integral curved connecting portion (6c, 7c).

3. A seat as claimed in claim 2, wherein said supporting structure (3) comprises a first C-shaped connecting member (40), in turn comprising a substantially straight central portion (42), and two curved end portions integral with the central portion and each connected to a respective end portion of a first straight portion (6a, 7a).

4. A seat as claimed in claim 3, wherein a respective smaller-section appendix (45) extends from each curved end portion; said appendix engaging an opening formed in an end portion of said first straight portion (6a, 7a).

5. A seat as claimed in claim 2, wherein said supporting structure (3) comprises a second C-shaped connecting member (60), in turn comprising a substantially straight central portion (62), and two curved end portions integral with the central portion and each connected to a respective end portion of a second straight portion (6b, 7b).

6. A seat as claimed in claim 5, wherein a respective smaller-section appendix (65) extends from each curved end portion; said appendix engaging an opening formed in an end portion of said second straight portion (6b, 7b).

7. A seat as claimed in claim 3, wherein said first C-shaped connecting member (40) comprises a core made of metal material, in particular an aluminium casting, covered with a layer of plastic material.

8. A seat as claimed in claim 5, wherein said second C-shaped connecting member (60) comprises a core made of metal material, in particular an aluminium casting, covered with a layer of plastic material.

9. A sear as claimed in claim 1, wherein the first and second lateral supporting member (6, 7) each comprise a section; said section comprising a C-shaped first side wall (12a) integral with two substantially flat walls (12b, 12c) facing each other and inclined with respect to each other so as to merge with a substantially C-shaped second side wall (12d).

10. A seat as claimed in claim 1, wherein at least one of said first and said second panel (4, 5) has a surface cover layer (70), in particular a cloth layer.

11. A seat as claimed in claim 1, wherein at least one of said first and said second panel (4, 5) is covered with a layer of soft material (79) to form a padded seat portion and/or backrest.

12. A vehicle seat as claimed in claim 1, wherein two integrally connected seats are provided;

adjacent lateral supporting members (6, 7) of different seats being defined by a single metal section.

13. A seat as claimed in claim 1, wherein said transverse member (8) has a first groove (24) and a second groove (24a) extending along opposite sides of the transverse member;

said first panel (4) having a rear edge (31) crosswise to said lateral edges (30); said rear edge being housed inside said first groove (24) of the transverse member; and said second panel (5) having a bottom edge (51) crosswise to said lateral edges (50); said bottom edge being housed inside said second groove (24a) of the transverse member.

14. A vehicle seat comprising a supporting structure (3), and a first and second contoured panel (4, 5) fitted to the supporting structure (3) and defining a seat portion and a backrest of the seat (1) respectively; wherein the supporting structure (3) comprises a first and a second lateral supporting member (6, 7) extending along opposite sides of the seat (1) and connected to each other by a transverse member (8) extending along a join between the seat portion and the backrest;

each lateral supporting member (6, 7) comprises a first straight portion (6a, 7a), and a second straight portion (6b, 7b);

each first straight portion (6a, 7a) has a respective first groove (13a) extending substantially along its whole length; and each second straight portion (6b, 7b) has a respective second groove (13b) extending substantially along its whole length;

two first grooves (13a) being positioned facing each other to house respective opposite lateral edges (30) of said first panel (4) to form said seat portion; and two second grooves (13b) being positioned facing each other to house respective opposite lateral edges (50) of said second panel (5) to form said backrest;

said transverse member (8) has a first groove (24) and a second groove (24a) extending along opposite sides of the transverse member;

said first panel (4) having a real edge (31) crosswise to said lateral edges (30); said rear edge being housed inside said first groove (24) of the transverse member; and said second panel (5) having a bottom edge (51) crosswise to said lateral edges (50); said bottom edge being housed inside said second groove (24a) of the transverse member.

\* \* \* \* \*